United States Patent [19]
Hönl et al.

[11] Patent Number: 6,124,385
[45] Date of Patent: Sep. 26, 2000

[54] HALOGEN-FREE FLAME RESISTANT POLYSTYROL MOULDING MATERIALS

[75] Inventors: Hans Hönl, Obersülzen; Hans-Dieter Schwaben, Freisbach; Norbert Mödersheim, Frankenthal, all of Germany

[73] Assignee: BASF Aktiengesellschaft, Ludwigshafen, Germany

[21] Appl. No.: 09/308,334

[22] PCT Filed: Nov. 11, 1997

[86] PCT No.: PCT/EP97/06274

§ 371 Date: May 19, 1999

§ 102(e) Date: May 19, 1999

[87] PCT Pub. No.: WO98/23674

PCT Pub. Date: Jun. 4, 1998

[30] Foreign Application Priority Data

Nov. 26, 1996 [DE] Germany .............. 196 48 799

[51] Int. Cl.$^7$ .................................. C08K 3/32
[52] U.S. Cl. ............... 524/115; 524/139; 524/141; 524/442; 524/174; 525/387; 525/68
[58] Field of Search ............... 524/141, 115, 524/139, 442, 174; 525/387, 68, 376, 185

[56] References Cited

U.S. PATENT DOCUMENTS

| | | | |
|---|---|---|---|
| 3,737,479 | 6/1973 | Haaf | 524/263 |
| 5,194,476 | 3/1993 | Casarini et al. | 524/360 |
| 5,268,425 | 12/1993 | Furuta | 525/68 |

FOREIGN PATENT DOCUMENTS

| | | |
|---|---|---|
| 489 321 | 6/1992 | European Pat. Off. . |
| 493 814 | 7/1992 | European Pat. Off. . |
| 530 558 | 3/1993 | European Pat. Off. . |
| 546 497 | 6/1993 | European Pat. Off. . |
| 587 100 | 3/1994 | European Pat. Off. . |
| 41 01 805 | 7/1992 | Germany . |

*Primary Examiner*—Robert Dawson
*Assistant Examiner*—Kuo-Liang Peng
*Attorney, Agent, or Firm*—Keil & Weinkauf

[57] ABSTRACT

A thermoplastic molding composition comprises, in each case based on the total of A to E, at least 3% by weight, but not more than 30% by weight, of a polyphenylene ether A, at least 10% by weight, but not more than 65% by weight, of an impact-modified styrene polymer B, at least 30% by weight of a (standard) styrene polymer C which is not impact-modified, from 0.05 to 5% by weight of a free-radical generator D, from 1 to 20% by weight of a phosphorus-containing flame retardant E, in particular an organophosphorus compound, such as triphenyl phosphate or triphenyl phosphine oxide.

7 Claims, No Drawings

HALOGEN-FREE FLAME RESISTANT POLYSTYROL MOULDING MATERIALS

The invention relates to flame-retardant thermoplastic molding compositions based on polyphenylene ethers (PPE) and styrene polymers (PS). Such mixtures are known per se and are suitable for producing moldings which have better heat resistance than impact-modified styrene polymers which are not blended with polyphenylene ether. The material properties of such moldings are generally satisfactory but these polymer mixtures have the disadvantage of encouraging the spread of fire. However, many attempts to make these materials flame retardant have resulted in reduced heat resistance.

DE-A-41 01 805 discloses the preparation of halogen-free, impact-modified and flame-retardant molding compositions with improved flowability, based on mixtures of impact-resistant polystyrene and polyphenylene ethers, which contain aromatic sulfonamides and phosphorus-containing compounds, such as triphenyl phosphate or triphenylphosphine oxide, as flame-retardant additives.

Typical molding compositions of the type proposed in DE-A-41 01 805 consist of, for example A: from 5 to 94% by weight of a polyphenylene ether A, B: from 3 to 94% by weight of an impact-modified styrene polymer B, C: from 1 to 20% by weight of an aromatic sulfonamide C, D: from 0 to 30% by weight of a phosphorus-containing flame-retardant D and E: if required, other additives E in the usual quantities.

Impact-modified polystyrene achieves improved flowability when aromatic sulfonamides are added, but at the cost of a significant reduction in heat resistance.

There are commercially available flame-retardant molding compositions which consist of about 30% by weight of polyphenylene ether, 60% by weight of impact-modified polystyrene, 10% by weight of phosphorus compounds, and a certain amount of melamine as well as conventional auxiliaries and stabilizers, but these mixtures are expensive, since they contain a relatively large amount of polyphenylene ether, which is complicated to prepare.

It is an object of the present invention to provide mixtures which are based on impact-modified styrene polymers and polyphenylene ethers and which give improved flame retardancy at lower raw material costs and production costs, especially for the consumer electronics sector (eg. TV cabinets).

We have found that this object is achieved by means of thermoplastic molding compositions based on a flame-retardant-containing mixture of an impact-modified styrene polymer and a polyphenylene ether, having a particularly good combination of properties and an especially good price-value ratio, comprising, in each case based on the total of A to E, at least 3% by weight, but not more than 30% by weight, of a polyphenylene ether A, at least 10% by weight, but not more than 65% by weight, of an impact-modified styrene polymer B, at least 30% by weight of a styrene polymer C which is not impact-modified, from 0.05 to 5% by weight of a free-radical generator D, from 1 to 20% by weight of a phosphorus-containing flame retardant E.

Component A

The polyphenylene ethers A are known and are preferably prepared by oxidative coupling of ortho-disubstituted phenols.

Examples of substituents are halogen, such as chlorine and bromine, and alkyl having from 1 to 4 carbon atoms, preferably without tertiary hydrogen in the α-position, eg. methyl, ethyl, propyl and butyl. The alkyl radicals may themselves be substituted with halogen, such as chlorine or bromine, or hydroxy-substituted. Further examples of possible substituents are alkoxy, preferably having up to 4 carbon atoms, and phenyl, which may be substituted with halogen and/or alkyl. Copolymers of various phenols, such as copolymers of 2,6-dimethylphenol and 2,3,6-trimethylphenol, are likewise suitable. Mixtures of various polyphenylene ethers may, of course, also be employed.

Preference is given to polyphenylene ethers which are compatible with vinylaromatic polymers, ie. are completely or very largely soluble in these polymers (cf. A. Noshay, Block Copolymers, p. 8–10, Academic Press, 1977 and O. Olabisi, Polymer-Polymer Miscibility, 1979, p. 117–189).

Examples of polyphenylene ethers are poly(2,6-dilauryl-1,4-phenylene) ether,
poly(2,6-diphenyl-1,4-phenylene) ether,
poly(2,6-dimethoxy-1,4-phenylene) ether,
poly(2,6-diethoxy-1,4-phenylene) ether,
poly(2-methoxy-6-ethoxy-1,4-phenylene) ether,
poly(2-ethyl-6-stearyloxy-1,4-phenylene) ether,
poly(2,6-dichloro-1,4-phenylene) ether,
poly(2-methyl-6-phenyl-1,4-phenylene) ether,
poly(2,6-dibenzyl-1,4-phenylene) ether,
poly(2-ethoxy-1,4-phenylene) ether,
poly(2-chloro-1,4-phenylene) ether and
poly(2,5-dibromo-1,4-phenylene) ether.

Preference is given to polyphenylene ethers in which the substituents are alkyl radicals with from 1 to 4 carbon atoms, such as poly(2,6-dimethyl-1,4-phenylene) ether,
poly(2,6-diethyl-1,4-phenylene) ether,
poly(2-methyl-6-ethyl-1,4-phenylene) ether,
poly(2-methyl-6-propyl-1,4-phenylene) ether,
poly(2,6-dipropyl-1,4-phenylene) ether and
poly(2-ethyl-6-propyl-1,4-phenylene) ether.

Graft copolymers of polyphenylene ethers and vinylaromatic polymers, such as styrene, α-methylstyrene, vinyltoluene and chlorostyrene, are also suitable.

Suitable polyphenylene ethers generally have an intrinsic viscosity $\eta_{sp}/c$ of from 0.2 to 0.7 dl/g, measured in chloroform at 25° C. This corresponds to a molecular weight range of from about 10000 to 60000.

Poly(2,6-dimethyl-1,4-phenylene) ether is preferred for the novel molding compositions.

Component B

Component B is an impact-modified styrene polymer (HIPS; high-impact polystyrene), prepared by polymerization of styrene and, if desired, ring-alkylated or side-chain-alkylated styrenes, in the presence of rubber. Preference is given to the exclusive use of impact-modified homopolystyrene obtained in the usual manner by polymerization of styrene in the presence of a rubber. The rubber content should be from 3 to 25% by weight, preferably from 5 to 15% by weight.

Rubbers which are employed for impact-modification of styrene polymers are appropriate natural or synthetic rubbers. For the purposes of the invention, this includes, for example, besides natural rubber, polybutadiene, polyisoprene and copolymers which are formed from butadiene and/or isoprene with styrene and other comonomers and which have a glass transition temperature below −20° C. (as in K. H. Illers and H. Breuer, Kolloidzeitschrift 176 (1961) p. 110). Butadiene polymers having a 1,4-cis content of from 25 to 99% by weight are particularly suitable, but acrylic rubbers, EPDM rubbers, polybutylene rubbers, polysiloxane rubbers and polyoctenamer rubbers may also be employed. In these, the rubber (soft phase) which is grafted with styrene is finely divided in the polystyrene phase, ie. hard matrix. The mean particle diameter ($d_{50}$ value of the integrated weight distribution) is generally from 0.2 to 7 µm. Suitable impact-modified polystyrenes are to a very large extent commercially available and have a viscosity number of the hard matrix of from 50 to 130 ml/g (0.5% strength in toluene at 23° C.).

Component C

Component C is a standard polystyrene (GPPS, not impact-modified), ie. a styrene polymer prepared by polymerization of styrene and, if desired, ring-alkylated or side-chain-alkylated styrenes, without the presence of rubber.

The processes for preparing styrene polymers are known and are described, for example in "Ullmanns Encyklopädie der technischen Chemie", 4th edition, Vol. 19, pp. 265–295, Verlag Chemie, Weinheim or H. Gerrens, Chem. Ing. Tech. 52 (1980), 477.

Component D

The use of free-radical generators to improve the flame retardancy of polymers is known per se. Suitable free-radical generators D are compounds belonging to a variety of classes, for example certain labile hydrocarbons, and also peroxides and azo compounds. A particularly suitable representative of the hydrocarbon class are dicumyl compounds. The use of free-radical generators in PPE/PS mixtures is described, for example, in EP-A1-546 497.

Component E

Suitable phosphorus compounds are the compounds conventionally used for fire protection which are in general commercially available, such as phosphoric acid esters, phosphinic acid esters, phosphonic acid esters and phosphine oxides. Elemental (red) phosphorus is also suitable if the pigmentation which it causes is acceptable. The phosphorus compounds are employed in amounts of up to 20% by weight, advantageously not more than 15% by weight. It is advantageous to employ at least one of the compounds triphenyl phosphate and triphenylphosphine oxide. It is particularly advantageous to use triphenyl phosphate and triphenylphosphine oxide together.

Other Additives

The novel mixtures may, if necessary, contain other additives (F) in usual amounts which are not included in the abovementioned total of A to E.

Examples of such other additives, other than conventional processing aids (stabilizers, such as sterically hindered phenols, lubricants, such as stearates or silicone oils) and dyes, of which no further details are given here, are primarily other flame-retardant substances, for example aromatic sulfonamides, nitrogen-containing compounds, such as melamine, or inorganic additives, such as aluminum hydroxide or magnesium hydroxide, or inorganic phosphates. The amounts of such additives are completely dependent upon the nature of their role in the novel mixture. For example, stabilizers are employed in amounts of from 0.01 to 0.5% by weight and flame-retardant substances, other than those according to the invention, are employed, for example, in amounts of from 0.5 to 2% by weight.

EXAMPLES

The novel mixtures were prepared on a Werner & Pfleiderer ZSK 53 twin-screw compounder (screw combination J 55, 250° C., 200 rpm, 35 kg/h), and the granules obtained were tested as shown in the tables.

The flammability tests were carried out according to Underwriters Laboratories UL 94. The target classification was V-2 at 2.4 mm.

The measurements made according to UL94 were: afterflame time; total afterflame time; dripping of flaming material For this purpose, each of 5 test specimens (rectangular bars measuring 125×13 mm and of thickness 2.4 mm) are clamped vertically and a 20 mm (±2 mm) high bunsen burner flame is applied twice to the lower free end of the sample, for 10 seconds on each occasion, the interval between the flame applications being equal to the afterflame time following the first application (ie. the second application of flame takes place when the first afterflaming ceases).

To evaluate the dripping of burning particles, a pad of absorbent cotton is arranged under the test specimens at a distance of 300 mm. The afterflame time is measured after each application of the flame to each test specimen, and thus the total afterflame time for a set of 5 test specimens is calculated.

The results are classified as follows:

V-0: afterflame time ≦ 10 seconds total afterflame time ≦ 50 seconds no dripping of flaming material V-1: afterflame time ≦ 30 seconds total afterflame time ≦ 250 seconds no dripping of flaming material V2: afterflame time ≦ 30 seconds total afterflame time ≦ 250 seconds dripping of burning material The abbreviations used in the examples represent the following materials (amounts in % by weight in each case):

VPU Impact-modified polystyrene made from
  8% of polybutadiene; particle size from 20–30 nm
  0.06% of zinc stearate
  92% of standard polystyrene (viscosity number 70)

VPT Standard polystyrene containing lubricant and made from
  0.06% of zinc stearate
  98.94% of standard polystyrene (viscosity number 74)

PPE Polyphenylene ether; commercially available product ®Noryl 8870, $M_w$=25,000

Stabilizer o-tert-Butylphenol; commercially available product ®Kerobit TBK

TPPA Triphenylphosphate; commercially available product

Masterbatch Standard polystyrene with 20% silicone oil

TABLE

| Composition (% by weight) | Comp 1 | Comp 2 | Comp 3 | Comp 4 | Comp 5 | Ex |
|---|---|---|---|---|---|---|
| VPU | 84.2 | 64.2 | 44.2 | 83.7 | 63.7 | 43.7 |
| VPT | 0 | 20 | 40 | 0 | 20 | 40 |
| PPE | 9 | 9 | 9 | 9 | 9 | 9 |
| TPPA | 6 | 6 | 6 | 6 | 6 | 6 |
| Dicumyl | 0 | 0 | 0 | 0.5 | 0.5 | 0.5 |
| Zinc stearate | 0.5 | 0.5 | 0.5 | 0.5 | 0.5 | 0.5 |

TABLE-continued

| Composition (% by weight) | | Comp 1 | Comp 2 | Comp 3 | Comp 4 | Comp 5 | Ex |
|---|---|---|---|---|---|---|---|
| Masterbatch | | 0.15 | 0.15 | 0.15 | 0.15 | 0.15 | 0.15 |
| Stabilizer | | 0.15 | 0.15 | 0.15 | 0.15 | 0.15 | 0.15 |
| Thermal and rheological values | | | | | | | |
| Vicat temperature VST/B/50 | °C. | 80 | 81 | 82 | 79 | 79 | 79 |
| Melt volume index 200/5 | ml/10 min | 9.1 | 10.6 | 13.9 | 9.2 | 11.7 | 16.5 |
| Mechanical values | | | | | | | |
| Fracture energy (FBT) (MT = 220° C.) | N/mm$^2$ | 1.5 | 0.21 | 0.14 | 7.4 | 0.25 | 0.18 |
| Charpy motched impact strength | kJ/m$^2$ | 9.7 | 8.4 | 6.2 | 9.1 | 8.1 | 5.7 |
| Yield stress | N/mm$^2$ | 27 | 30 | 29 | 26 | 24 | 34 |
| Nominal elongation at break | % | 34 | 28 | 28 | 35 | 33 | 19 |
| Tensile modulus of elasticity | N/mm$^2$ | 1950 | 2150 | 2100 | 1900 | 1850 | 2450 |
| Flammability (2.4 mm bar) | | | | | | | |
| UL 94 | | — | — | — | — | — | V-2 |
| Afetrflame time | sec | 210 | 182 | 146 | 98 | 103 | 30 |
| Total afterflame time | sec | 648 | 588 | 519 | 337 | 222 | 152 |

We claim:

1. A thermoplastic molding composition comprising, in each case based on the total of A to E, at least 3% by weight, but not more than 30% by weight, of a polyphenylene ether A, at least 10% by weight, but not more than 65% by weight, of an impact-modified styrene polymer B, at least 30% by weight of a standard styrene polymer C which is not impact-modified, from 0.05 to 5% by weight of a free-radical generator D, from 1 to 20% by weight of a phosphorus-containing flame retardant E.

2. A molding composition as defined in claim 1 which includes, as free-radical generators D, labile hydrocarbons peroxides or azo compounds.

3. A molding composition as defined in claim 1 which includes, as phosphorus-containing flame retardant E, an organophosphorus compound.

4. A molding composition as defined in claim 1 which includes, as phosphorus-containing flame retardant E, triphenyl phosphate or triphenylphosphine oxide or mixtures of these.

5. A molding composition as defined in claim 1 which additionally includes further flame-retardant substances selected from the group consisting of the aromatic sulfonamides, melamine, inorganic phosphates, aluminum hydroxide and magnesium hydroxide.

6. A molding composition as defined in claim 1 which additionally includes sterically hindered phenols, stearates or silicone oils.

7. A molding composition as defined in claim 1, wherein the free-radical generator D is a dicumyl compound.

* * * * *

UNITED STATES PATENT AND TRADEMARK OFFICE
CERTIFICATE OF CORRECTION

PATENT NO.: 6,124,385

DATED: September 26, 2000

INVENTOR(S): HOENL et al.

It is certified that error appears in the above-identified patent and that said Letters Patent is hereby corrected as shown below:

Col. 6, claim 7, last line, "a dicumyl compound" should be --dicumyl--.

Signed and Sealed this

First Day of May, 2001

*Attest:*

NICHOLAS P. GODICI

*Attesting Officer*   *Acting Director of the United States Patent and Trademark Office*